United States Patent
Graf et al.

(10) Patent No.: US 9,199,737 B2
(45) Date of Patent: Dec. 1, 2015

(54) BAGGAGE COMPARTMENT FOR AN AIRCRAFT AND AIRCRAFT HAVING THE BAGGAGE COMPARTMENT

(71) Applicants: Diehl Aircabin GmbH, Laupheim (DE); Diehl Aerospace GmbH, Ueberlingen (DE)

(72) Inventors: Oleg Graf, Illertissen (DE); Michael Zinke, Postbauer-Heng (DE); Andreas Hanft, Nuremberg (DE)

(73) Assignees: DIEHL AIRCABIN GMBH, Laupheim (DE); DIEHL AEROSPACE GMBH, Ueberlingen (DE)

( * ) Notice: Subject to any disclaimer, the term of this patent is extended or adjusted under 35 U.S.C. 154(b) by 330 days.

(21) Appl. No.: 13/827,858

(22) Filed: Mar. 14, 2013

(65) Prior Publication Data

US 2013/0257246 A1     Oct. 3, 2013

(30) Foreign Application Priority Data

Mar. 26, 2012   (DE) .......................... 10 2012 005 918

(51) Int. Cl.
    *B64D 11/00*       (2006.01)

(52) U.S. Cl.
    CPC .................................... *B64D 11/003* (2013.01)

(58) Field of Classification Search
    CPC .............................. B64D 11/00; B64D 11/003
    See application file for complete search history.

(56) References Cited

U.S. PATENT DOCUMENTS

| | | | | |
|---|---|---|---|---|
| 4,715,241 A | * | 12/1987 | Lipinski et al. | 74/89.31 |
| 5,244,269 A | * | 9/1993 | Harriehausen et al. | 312/247 |
| 5,456,529 A | * | 10/1995 | Cheung | 312/245 |
| 5,848,554 A | * | 12/1998 | Kober et al. | 74/89.35 |
| 6,045,204 A | * | 4/2000 | Frazier et al. | 312/247 |
| 6,691,951 B2 | * | 2/2004 | Frazier | 244/118.1 |
| 6,791,215 B2 | * | 9/2004 | Tesar | 310/12.24 |
| 7,118,068 B2 | * | 10/2006 | Graf et al. | 244/118.5 |
| 7,143,977 B2 | * | 12/2006 | Graf et al. | 244/118.1 |
| 8,783,609 B2 | * | 7/2014 | Schneider et al. | 244/118.5 |
| 2001/0011692 A1 | | 8/2001 | Sprenger et al. | |
| 2005/0218264 A1 | | 10/2005 | Graf et al. | |
| 2009/0301239 A1 | * | 12/2009 | Heinrichs | 74/89.37 |
| 2011/0133029 A1 | | 6/2011 | Berkenhoff et al. | |
| 2012/0318917 A1 | * | 12/2012 | Schneider et al. | 244/118.5 |

FOREIGN PATENT DOCUMENTS

| | | |
|---|---|---|
| DE | 100 01 038 A1 | 9/2001 |
| DE | 10 2009 057 014 A1 | 6/2011 |
| WO | WO 03/097457 A1 | 11/2003 |

* cited by examiner

*Primary Examiner* — Justin Benedik
(74) *Attorney, Agent, or Firm* — Scully, Scott, Murphy & Presser

(57) ABSTRACT

A baggage compartment for an aircraft is provided. A housing and a baggage container of the compartment are mounted to each other to allow pivotable movement of the baggage container along a pivot axis. As a result, the baggage container is moveable from an open position into a closed position. The compartment has a pulling arrangement for transferring a pulling force to the baggage container to move the baggage container from the open position into the closed position. The compartment also has a drive arrangement for transferring the pulling force to the pulling arrangement. The drive arrangement has a linear drive and a sliding device.

14 Claims, 6 Drawing Sheets

BAGGAGE COMPARTMENT FOR AN AIRCRAFT AND AIRCRAFT HAVING THE BAGGAGE COMPARTMENT

BACKGROUND OF THE INVENTION

The invention relates to a baggage compartment for an aircraft, wherein the baggage compartment includes a housing and a baggage container, wherein the baggage container is mounted in the housing so as to be pivotable about a pivot axis, wherein, with a pivoting movement, the baggage container is transferable from an open position into a closed position, including a pulling arrangement, wherein the pulling arrangement includes at least one pulling means for transferring a pulling force to the baggage container in order to transfer the baggage container from the open position into the closed position, and having a drive arrangement, wherein the drive arrangement is realized to transfer the pulling force to the pulling means.

DISCUSSION OF THE PRIOR ART

The purpose of baggage compartments in the aircraft is to accommodate the baggage of passengers. Often, these types of baggage compartments are arranged in the overhead area above the rows of seats for the passengers and are also designated in specialist jargon as 'hat racks'. In principle, at least two types of such baggage compartments are known. In the case of a first type, the baggage compartment has a baggage flap which can be opened in order to fill the statically arranged baggage compartment. In a second type, the baggage compartments include a housing in which a chute is pivotably mounted, the chute being pivoted out for loading and, once loaded, being pivoted in again such that a fill opening of the chute is closed by the housing and items of baggage are stowed securely in the chute.

A baggage compartment of this type is disclosed, for example, in document DE 10 2009 057 014 A1 which surely forms the nearest prior art. The device for the automatic closing and opening of the baggage compartment described in the document includes an electric motor and a gas compression spring for driving two wrap-around rollers of a cable winding apparatus, by means of which a first and a second cable connected to the chute are guided. An electric motor speed is transferred to the cable winding apparatus by means of a gear, as a result of which the chute is opened or closed. The gear also transfers the electric motor speed to a toothed rod, as a result of which the toothed rod is displaced and the gas compression spring is pretensioned.

SUMMARY OF THE INVENTION

The object underlying the invention is to propose a baggage compartment with a reliable, automated method of operation.

The present invention is directed to a baggage compartment which is suitable and/or is realized for an aircraft, in particular a passenger aircraft. The baggage compartment can preferably be incorporated or is incorporated in an aircraft cabin, in particular, it is realized to be mounted in an overhead area above the rows of passengers. The baggage compartment is preferably realized as a component or as a segment of a so-called hat rack or it forms the hat rack.

The baggage compartment includes a housing, which preferably has mechanical interfaces for fastening the baggage compartment in the aircraft cabin. In particular, the housing includes at least two housing side walls and one housing top side, further baggage compartments or end regions of a row of baggage compartments preferably connecting to the two housing side walls. In a preferred development the baggage compartment, in particular the housing, is realized as a plastics material part, in particular as a plastics material injection moulded part.

In addition, the baggage compartment includes a baggage container which includes a first and a second container side wall, a container bottom, a container front side and a container rear side. It is particularly preferred for the baggage container to be realized as a plastics material part, in particular as a plastics material injection moulded part. It is preferred for the baggage container to be realized as a chute, especially as a so-called pivot bin. As such, the baggage container has a receiving opening, through which it can be loaded with baggage objects, in particular hand baggage.

The baggage container is mounted in the housing so as to be pivotable about a pivot axis. Consequently, with a pivoting movement, the baggage container is transferable from an open position into a closed position. In the same way, by means of a counter pivoting movement, the baggage container is transferable from the closed position into the open position. The pivot axis can run through the baggage container or can be arranged offset with respect to the same. In particular, the pivot axis penetrates the planes formed by the container side walls.

The baggage compartment includes a pulling arrangement, wherein the pulling arrangement includes at least one pulling means for transferring a pulling force to the baggage container. The pulling means is realized, in particular, as a cable, in the case of modified embodiments it can also be realized as a belt or as another, preferably flexible, material, which is realized to transfer a pulling force, however, preferably not to transfer a pressing force. The purpose of the pulling arrangement is to transfer the baggage compartment from the open position into the closed position. In a particularly preferred manner, the pulling means is fastened on the baggage container or is coupled to said baggage container such that the baggage container can be pulled closed by way of the pulling means.

In addition, the baggage compartment has a drive arrangement, in particular a motor-operated drive arrangement, the drive arrangement being realized to transfer the pulling force to the pulling means. In particular, the pulling means is pulled by the drive arrangement such that the baggage container, which is preferably fastened on the pulling means, is entrained and, as a result, is transferred from the open position into the closed position.

Within the framework of the invention, it is proposed that the drive arrangement has a linear drive, in particular a motor-operated linear drive, with a sliding device which is movable in a first linear direction. The movement path can be, for example, at least 10 cm, preferably at least 20 cm and in particular at least 30 cm. The at least one pulling means is coupled to the sliding device such that the moving of the sliding device in the first linear direction entrains the pulling means and, as a result, transfers the pulling force to the at least one pulling means such that the baggage container is transferred from the open position into the closed position. In a particularly preferred manner, the drive arrangement is fastened on the housing such that the baggage container can be pulled to the housing by means of the pulling arrangement.

One consideration of the invention is to use a linear drive instead of known wrap-around rollers. The advantage of a linear drive of this type compared to wrap-around rollers is that the pulling means is guided in a more controlled manner as it is not wound in an overlapping manner but only has to be pulled in the first linear direction. As a result, a very reliable method of operation of the drive arrangement and consequently of the baggage compartment is achieved. The advantage of the linear drive when the baggage container of a baggage compartment is actuated is that there is sufficient space present, in particular in the rear region of the baggage compartment, to accommodate the linear drive. Further advantages brought about by the linear drive are produced in that there can be a speed reduction when transferring the rotational movement of a drive motor to the linear movement of the sliding device such that, where applicable, it is possible to dimension a reduction gear at least in a smaller manner. In a particularly preferred manner, the drive arrangement has a drive motor, in particular an electric motor.

In the case of a preferred development of the invention, the linear drive includes a spindle screw, a spindle of the spindle screw being rotated by the drive motor and a spindle nut being moved in the first linear direction on account of the rotation of the spindle. In the case of a particularly preferred development of the invention, the spindle screw is realized as a ball screw which has balls as rolling bodies between the spindle nut and the spindle, which run in grooves of the spindle. The use of a ball screw in place of a conventional sliding lead screw or cylindrical screw has advantages with regard to the smaller amount of friction, a smaller amount of wear on the components and an increase in the achievable desired travelling speed. Consequently, fewer requirements for servicing can be expected, which is important, in particular for use in an aircraft.

In the case of a preferred structural development of the invention, the linear drive is aligned parallel to the pivot axis. In particular, the first linear direction is oriented parallel to the pivot axis. In said position in relation to the pivot axis, there is a comparatively large amount of installation space available on account of the width of the baggage container, whereas the installation space in the radial direction with respect to the pivot axis is usually greatly restricted. By using the linear drive, the available installation space is consequently utilized particularly well.

In the case of a preferred further development of the invention, the at least one pulling means is arranged, in particular integrally mounted, on one of the container side walls. In order to ensure a transfer of the pulling force, it is preferred for the pulling arrangement to have one or several guide devices which guide the course of the at least one pulling means such that the pulling means extends in the end region in relation to the baggage container such that the baggage container can be pulled from the open position into the closed position.

In the case of a preferred structural development of the invention, the sliding device includes a drive portion and a slide, wherein the slide is movable in the first linear direction independently of the drive portion. The drive portion can be coupled to the spindle nut, for example, such that said drive portion is guided in the linear direction together with the spindle nut. The slide is movable freely from the drive portion in the first linear direction. In particular, a distance between the drive portion and the slide can be modified, at least so long as the slide and the drive portion are not situated at an end stop. The at least one pulling means is coupled to the slide and the slide is arranged in front of the drive portion in the linear direction. In particular, the at least one pulling means extends from the slide in the opposite direction with respect to the first linear direction. When the drive portion is moved in the first linear direction, the slide is pushed by the drive portion into the first linear direction. The coupling between the slide and the drive portion is effected in a positive-locking manner with reference to the first linear direction. In particular, the slide and the drive portion abut against each other. Through the movement of the slide into the first linear direction, the pulling means is pulled into the first linear direction and the baggage container is transferred from the open position into the closed position by means of the pulling arrangement. The advantage of said development of the invention is that the slide is able to free-wheel which can be utilized when, for example, the pulling means has to be hauled in quicker than the drive portion allows.

In the case of a preferred further development of the invention, the baggage compartment includes a return device, wherein the return device is realized to pull the slide in the first linear direction independently of the drive portion. In particular, the slide is pre-tensioned into the first linear direction by the return device. It is, in this case, a consideration of said further development that in addition to or instead of the baggage container being transferred by motor from the open position into the closed position, a manual transfer is also possible by, for example, a passenger pivoting the baggage container closed in a manual manner. It is to be feared, in this case, that the pulling means is not hauled in quick enough by the drive portion, twists into loops or the like and, as a result, could jump out of the guide of the pulling arrangement. The return device ensures that even in the case of a manual transfer from the open position into the closed position, the pulling means is always tautly tensioned at a minimum tension such that it is impossible for the pulling means to come out of the pulling arrangement.

In a particularly preferred manner, the return device has a spring-loaded wrap-around roller and a belt which can be wound onto the wrap-around roller. The spring-loading of the wrap-around roller is effected, for example, by means of a torsion spring. The belt is fastened on the slide and is pre-tensioned by the wrap-around roller such that the slide is pre-tensioned in the described manner in the first linear direction.

In the case of a preferred structural development of the invention, the baggage compartment includes an, in particular separate, linear guide, wherein the slide is mounted on the linear guide so as to be displaceable in the first linear direction. The achievement of the linear guide, which is arranged in particular separately to the spindle screw, is that any moments of tilt possibly occurring which are introduced into the slide by the pulling means, can be removed by means of the linear guide and do not load the linear drive, in particular the spindle screw. Said spindle screw, consequently, has to accommodate a purely axial load such that it is possible to dispense with additional supports for the linear drive in the radial direction with respect to the linear drive and incorporation is simplified. In the case of a preferred structural further development of the invention, the linear guide includes two rails which are arranged parallel to each other, between which the linear drive is arranged and on which the slide runs.

In the case of a preferred realization of the invention, the pulling arrangement includes two pulling means, which are coupled to the slide. In particular, the free ends of the two pulling means are connected to the slide. In addition, the baggage compartment includes a guide roller which guides one of the pulling means, as a guide pulling means, into an opposite direction with respect to the first pulling means. In said development, it is possible for one of the pulling means to run in the opposite direction with respect to the first linear direction. For the purposes of the description, it is established that the guide roller defines a guide plane.

In the case of a preferred structural further development of the invention, the linear guide is arranged in an angled manner with respect to the guide plane in a cross section at right angles with respect to the first linear direction. The achievement of said structural development is that even the slide is arranged in an angled manner with respect to the guide plane, the guide pulling means extending in the guide plane and the other pulling means extending in a plane parallel thereto such that the other pulling means does not collide with the guide roller as an interference contour. Said development allows for a very compact realization of the drive arrangement and consequently of the baggage compartment.

In the case of a preferred structural implementation of the invention, the baggage compartment includes a carrier plate, on which the drive arrangement is arranged, and a support part, which is also mounted on the carrier plate. The linear drive is supported on the support part in an axial direction with respect to the first linear direction. With the aim of only introducing small forces into the carrier plate, it is provided that the guide roller is also arranged on the support part, which guide roller forms a force in the opposite direction to the supporting direction of the linear output when the drive arrangement is actuated. Only small forces are introduced into the carrier plate in this way.

In one possible structural realization, the linear drive has the spindle, the spindle being supported on the support part by means of an axial bearing.

The present invention is directed to an aircraft comprising at least one baggage compartment as described above.

BRIEF DESCRIPTION OF THE DRAWINGS

Further features, advantages and effects of the invention are produced from the following description of preferred exemplary embodiments of the invention. In which.

DETAILED DESCRIPTION OF THE INVENTION

Figure 1:
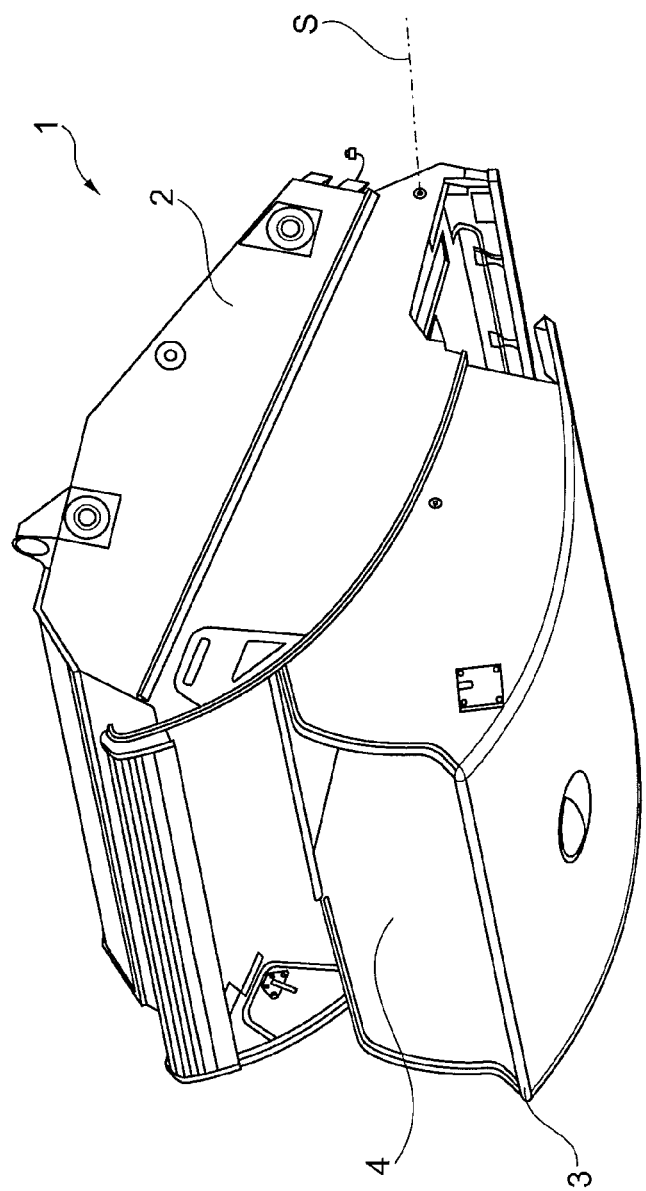
FIG. 1 shows a schematic three-dimensional representation of a baggage compartment as one exemplary embodiment of the invention.

FIG. 1 shows a schematic three-dimensional representation of a baggage compartment 1 for an aircraft, in particular for a passenger aircraft. The baggage compartment 1 is mounted, for example, above the rows of seats for the passengers in the aircraft. A baggage compartment 1 of this type or a plurality of these types of baggage compartments 1 are also designated as hat racks.

The baggage compartment 1 includes a housing 2, which is arranged in a stationary manner in the aircraft. The housing 2 can consist of plastics material, for example. A baggage container 3 is accommodated in the housing 2 and is mounted so as to be pivotable about a pivot axis S (cf. FIG. 2). In FIG. 1 the baggage container 3 is shown in an open position, a baggage opening 4 of the baggage container 3 being accessible for loading with items of baggage by the passengers. By means of a pivoting movement of the baggage container 3 about the pivot axis S, the baggage container 3 can be transferred into a closed position by said baggage container being pivoted by approximately 30 degrees about the pivot axis S such that the baggage opening 4 is closed by the housing 2. The baggage container 3 is realized, in particular, as a chute or as a pivot bin.

Figure 2:
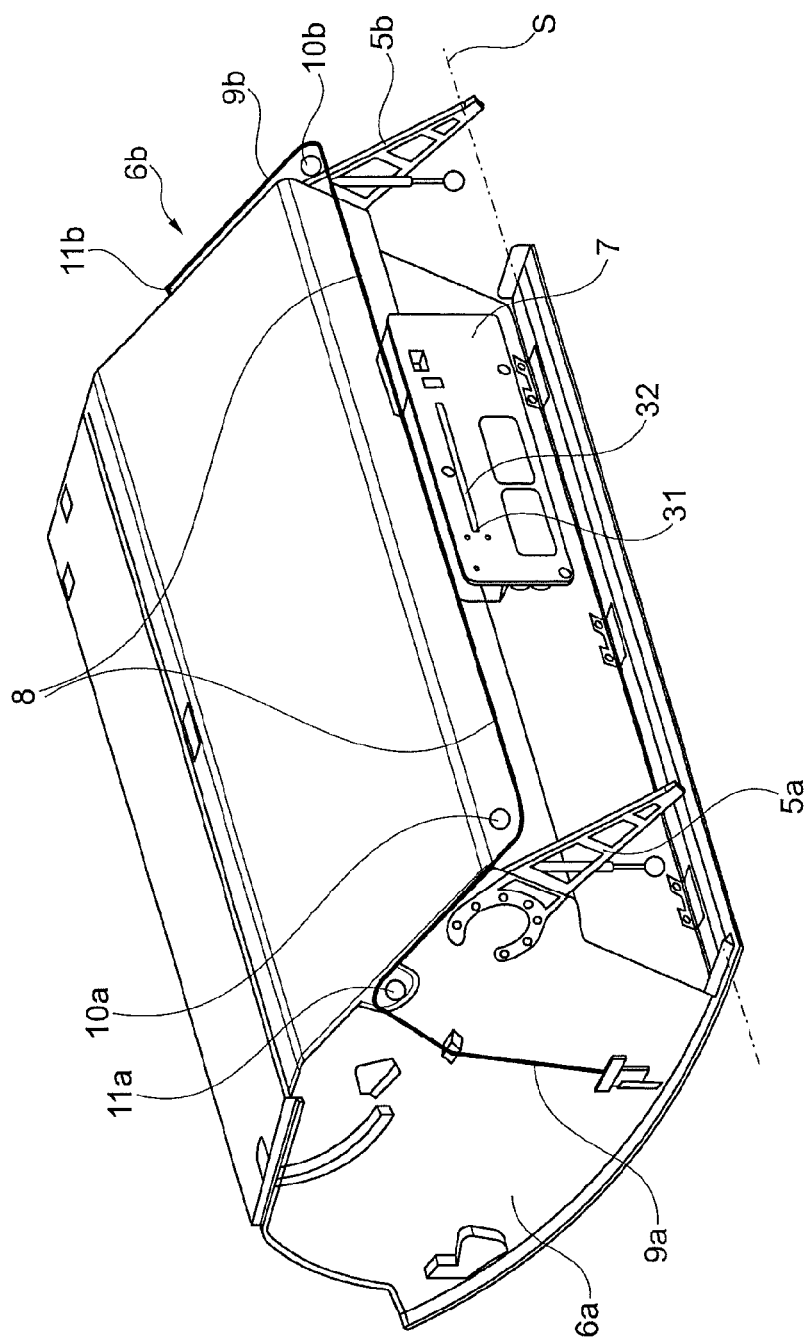
FIG. 2 shows a schematic three-dimensional representation of the baggage container in the baggage compartment in FIG. 1.

FIG. 2 shows a schematic three-dimensional view of the rear side of the baggage container 3 of FIG. 1. The baggage container 3 has two pivot arms 5a, b, which are arranged in a projecting manner and through the free ends of which the pivot axis S extends. The pivot axis S passes through, in particular, the planes formed by container side walls 6a, b.

FIG. 2 shows a drive module 7 which is fastened on the housing 2 (not shown in FIG. 2). The drive module 7 is realized for driving a pulling arrangement 8 and serves for pivoting the baggage container 3 in relation to the housing 2 about the pivot axis S. The pulling arrangement 8 includes two pulling means, which are realized as cable pulls 9a, b, the cable pulls 9a, b being guided in each case by means of two guide devices 10a, b or 11a, b (not shown), which are fixedly connected to the housing 2 and the ends of which are fixedly connected to the container side walls 6a, b. If the cable pulls 9a, b are acted upon with a pulling force, the baggage container 3 is pivoted about the pivot axis S and transferred from the open position (FIG. 1) into a closed position.

Figure 3:
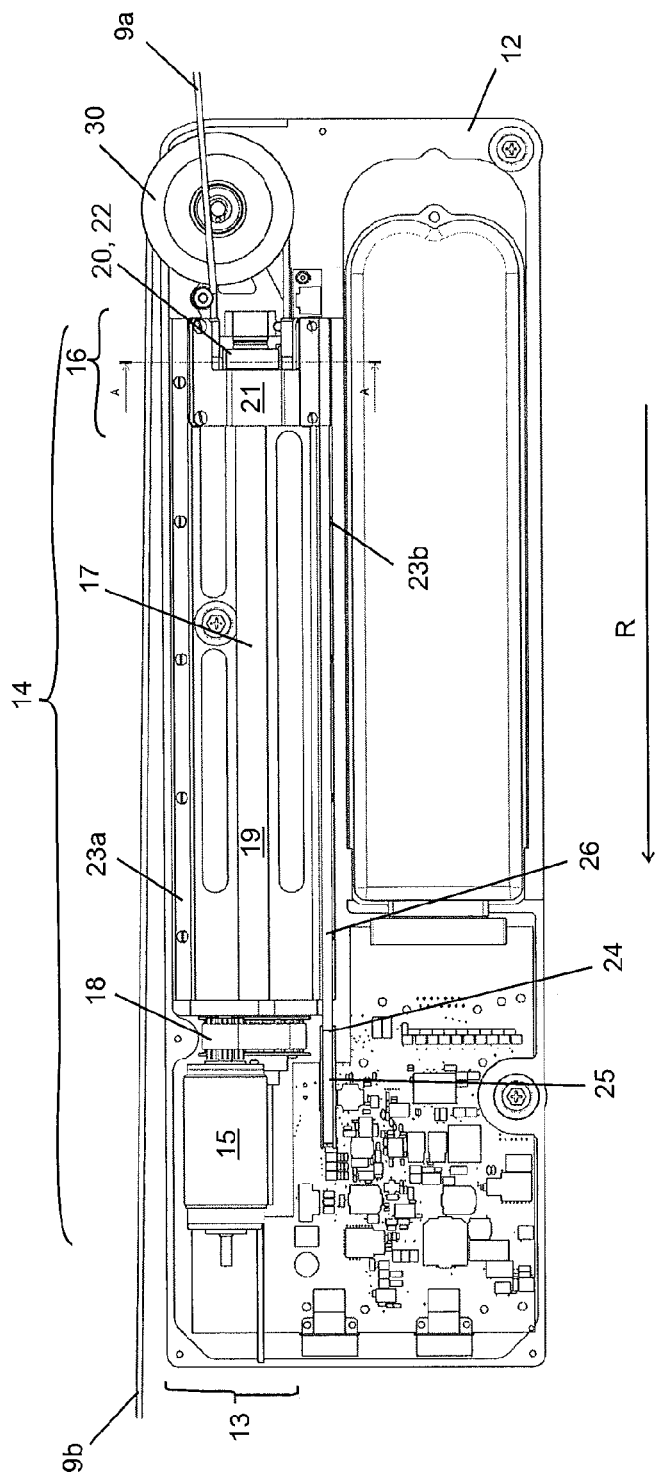
FIG. 3 shows a schematic top view of a drive module for the baggage compartment of the preceding figures.

FIG. 3 shows a top view from above of the drive module 7. The cable pulls 9a, b are shown again in the representation.

The drive module 7 includes a carrier plate 12, onto which a drive arrangement 13 is placed. The drive arrangement 13 is realized to transfer the pulling force to the cable pulls 9a, b by the cable pulls 9a, b being pulled into the drive module 7. The drive arrangement 13 has a linear drive 14, which is driven by a drive motor 15. The linear drive 14 includes a sliding device 16, which is driven by means of a ball screw 17.

More precisely, the drive motor 15 generates a driving torque which is converted into a rotation of a threaded spindle 19 by means of a gear 18. A spindle nut 20, which forms a drive portion for the slide device 16, sits on the threaded spindle 19. The slide arrangement 16 additionally includes a slide 21, which is arranged adjacent to the spindle nut 20 or to a spindle nut mounting 22. The rotation of the threaded spindle 19 is converted by the spindle nut 20 into a travelling movement into a first linear direction R.

The slide 21 is arranged in front of the spindle nut 20 or the spindle nut mounting 22 with reference to the first linear direction R such that in the case of a linear movement of the spindle nut 20 in the first linear direction R, the slide 21 is also moved into the first linear direction R. The free ends of the cable pulls 9a, b are fixed on the slide 21 such that as the slide 21 moves into the first linear direction R, the cable pulls 9a, b are pulled into the drive module 7 and, as a result, the baggage container 3 is transferred from the open position into the closed position.

Figure 4:
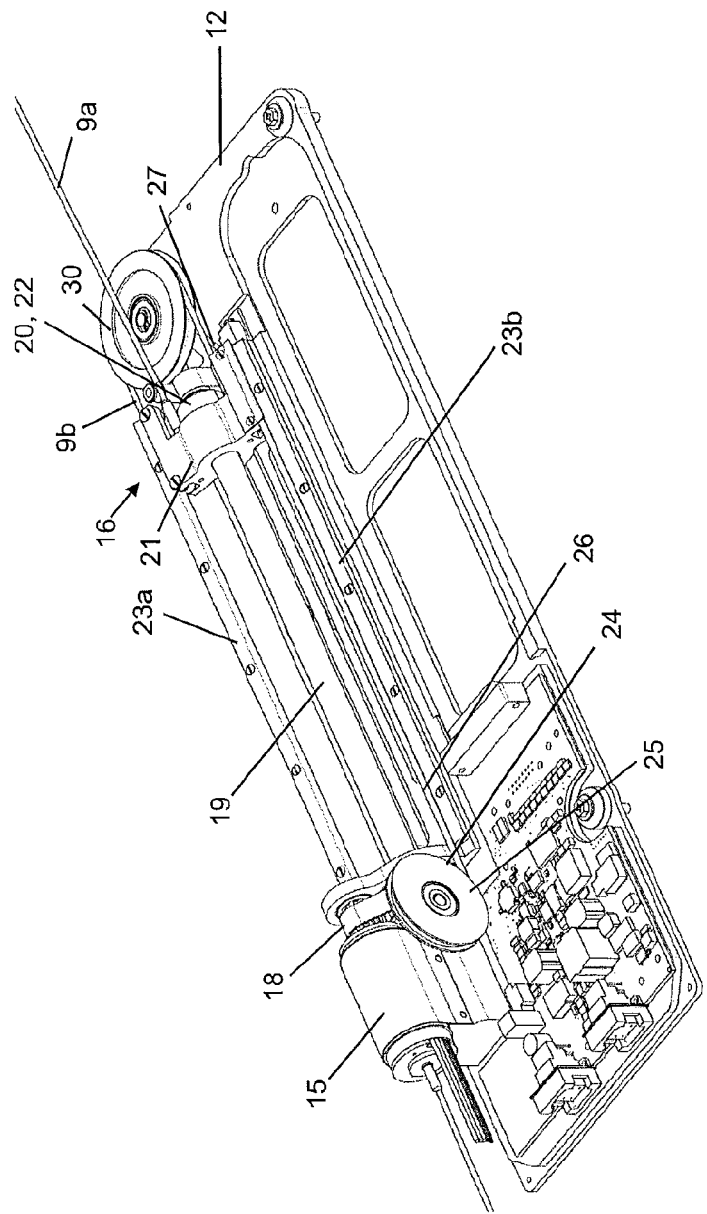
FIG. 4 shows a schematic three-dimensional representation of the drive module of FIG. 3.

The slide 21 is guided—as can be seen in particular from FIG. 4—by means of a linear guide which extends parallel to the first linear direction R and which is formed by two rails 23a, b, on which the slide 21 is mounted so as to be movable by means of rollers. The slide 21 and the spindle nut 20 or spindle nut mounting 22 are arranged so as to abut against each other, but are not non-detachably connected together. In particular, the slide 21, in the position shown in FIG. 3, can be moved into the first linear direction R independently of the spindle nut 20.

The drive module 7 additionally includes a return device 24 for the slide 21 which includes a spring-loaded wrap-around roller 25 and a belt 26. The free end of the belt 26 is secured on the slide 21. The spring-loading of the wrap-around roller 25 is realized such that the belt 26 is actively rolled onto the wrap-around roller 25. The wrap-around roller 25 is arranged on the free end of the linear drive 14, which extends in the direction of the first linear direction R. Consequently, the slide 21 is continuously pulled into the first linear direction R by the return device.

In the case of an automated pivoting movement from the open position into the closed position of the baggage container 3, the gear spindle 19 is rotated by means of the drive motor 15 and the gear 18, the spindle nut 20 being moved into the first linear direction R and, by means of the spindle mounting 22, entraining the slide 21 in the same direction such that the cable pulls 9a, b are pulled into the drive module 7. On account of the inherent weight of the baggage container 3, the cable pulls 9a, b are always under tension such that even a transfer from the closed position into the open position is able to be implemented in an automated manner by the drive motor 15 being activated in the opposite direction.

For the case where the baggage container is closed manually, the pivoting movement from the open position into the closed position being performed in a manual manner, there is the risk of the cable pulls 9a, b, becoming slack insofar as the cable pulls 9a, b might not be able to be pulled in sufficiently rapidly by the linear drive 14. In this case, the slack cable pulls 9a, b are tightened by the return device 24 by the slide 21 being pulled in the first linear direction R away from the spindle nut 20 or the spindle nut mounting 22.

Figure 5:
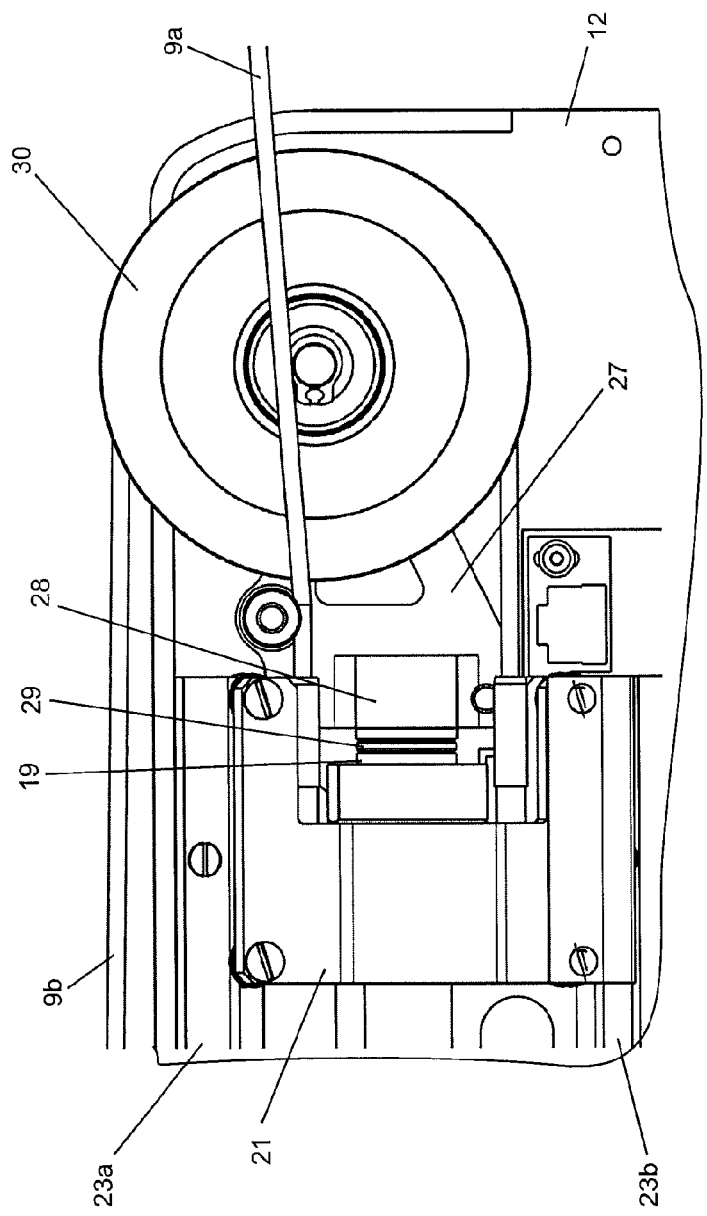
FIG. 5 shows a cutout of a detail from the top view in FIG. 3.

FIG. 5 shows a cutout of a detail of the drive arrangement 13. It can be seen from the representation of said detail that the drive module 7 has a support part 27 which is secured on the carrier plate 12. The support part 27 is produced from one piece, for example by means of milling. The support part 27 has a support region 28, on which the threaded spindle 19 is supported by means of an axial bearing 29. In addition, a guide roller 30, which guides the cable pull 9b, rests on the support part 27. If we look at the introduction of force into the support part 27, a force is introduced in the opposite direction to the first linear direction R by means of the axial bearing 29 and a force is introduced into the support part 9 in the first linear direction by means of the guide roller 30 such that said forces are mutually compensated in the support part 27. The achievement of said structural development is that smaller forces can be introduced into the carrier plate 12. In the exemplary embodiment shown the carrier plate 12 is produced from plastics material.

It can also be seen from the representation of the detail in FIG. 5 that the slide 21 is supported on both sides on the rails 23a, b with respect to the threaded spindle 19. In the top view, the free ends of the cable pulls 9a, b are also distributed on both sides with respect to the threaded spindle 19.

Figure 6:
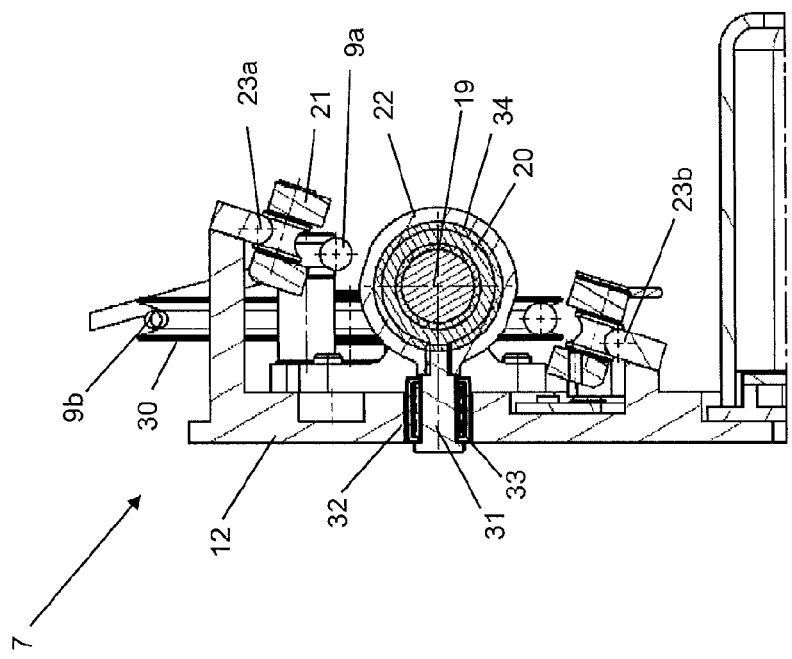
FIG. 6 shows a schematic sectioned view along the line of intersection A-A according to FIG. 3.

FIG. 6 shows a cross section through the drive module 7 along the line of intersection A-A in FIG. 3. It can be seen from the cross section that the spindle nut mounting 22 has an extension arm 31, which protrudes radially with respect to the threaded spindle 19 and is guided in a further linear guide 32 in order to suppress a rotating of the spindle nut mounting 22 and consequently of the spindle nut 20 about the threaded spindle 19. In order to reduce the friction of the extension arm 31 in the further linear guide 32, the extension arm 31 has a roller 33. It is pointed out that the linear guide 32 and the extension arm 31 can be seen schematically in the drive module 7 in FIG. 2. The spindle nut mounting 22 is arranged coaxially with respect to the spindle nut 20 and is connected thereto by means of a screw connection 34.

The guide roller 30 can also be recognized again in the cross section, it being able to be seen that the guide roller 30 defines a plane which is aligned parallel to the carrier plate 12. In the representation, however, the rails 23a or 23b define a second plane which is aligned in an angled manner with respect to the first plane. The advantage of said angled arrangement is that the cable pulls 9a, b are guided in a manner offset from each other laterally such that the cable pull 9a does not collide with the guide roller 30.

LIST OF REFERENCES

1 Baggage compartment
2 Housing
3 Baggage container
4 Baggage opening
5 Pivot arm
6 Container side walls
7 Drive module
8 Pulling arrangement
9 Cable pull
10 Guide device
11 Guide device
12 Carrier plate
13 Drive arrangement
14 Linear drive
15 Drive motor
16 Sliding device
17 Ball screw
18 Gear
19 Threaded spindle
20 Spindle nut
21 Slide
22 Spindle nut mounting
23 Rails
24 Return device
25 Wrap-around roller
26 Belt
27 Support part
28 Support region
29 Axial bearing
30 Guide roller
31 Extension arm
32 Linear guide
33 Roller
34 Screw connection
S Pivot axis

What is claimed is:

1. A baggage compartment for an aircraft, comprising:
a housing and a baggage container, wherein the baggage container is mounted in the housing to be pivotable about a pivot axis, wherein the baggage container is moveable from an open position into a closed position by the pivotal movement of the baggage container with respect to the housing,
a pulling arrangement, wherein the pulling arrangement comprises at least one pulling means for transferring a pulling force to the baggage container to move the baggage container from the open position into the closed position,
a drive arrangement, wherein the drive arrangement transfers the pulling force to the pulling means,
wherein the drive arrangement comprises a linear drive and a sliding device movable in a first linear direction,
wherein the at least one pulling means is coupled to the sliding device, such that the moving of the sliding device in the first linear direction transfers the pulling force to the at least one pulling means, thereby moving the baggage container from the open position into the closed position.

2. The baggage compartment according to claim 1, wherein the linear drive comprises a threaded spindle drive.

3. The baggage compartment according to claim 1, wherein the linear drive extends parallel with respect to the pivot axis.

4. The baggage compartment according to claim 1, wherein the at least one pulling means is connected to a container side wall of the baggage container.

5. The baggage compartment according to claim 1,
wherein the sliding device comprises a drive portion and a slide,
wherein the at least one pulling means is coupled to the slid; and
wherein the slide is arranged in front of the drive portion in the first linear direction, such that the slide is pushed by the drive portion into the first linear direction to move the baggage container from the open position into the closed position.

6. The baggage compartment according to claim 5, further comprising a return device, wherein the return device pulls the slide in the first linear direction independently of the drive portion.

7. The baggage compartment according to claim 6, wherein the return device comprises a spring-loaded wrap-around roller and a belt, wherein the belt is fastened on the slide and is pre-tensioned by the spring-loaded wrap-around roller.

8. The baggage compartment according to claim 5, further comprising a linear guide, wherein the slide is mounted on the linear guide to be displaceable in the first linear direction.

9. The baggage compartment according to claim 8, wherein the linear guide comprises two parallel rails and the linear drive is arranged between the parallel rails.

10. The baggage compartment according to claim 5, wherein the pulling arrangement comprises:
a first cable pull and a second cable pull, wherein the first cable pull and the second cable pull are connected to slide; and
a guide roller, wherein the guide roller guides the second cable pull into an opposite direction of the first cable pull and the guide roller defines a guide plane.

11. The baggage compartment according to claim 10, wherein the linear guide is arranged in an angled manner with respect to the guide plane.

12. The baggage compartment according to claim 10, further comprising:
a carrier plate, wherein the drive arrangement is arranged on the carrier plate, and a support part, wherein the linear drive is supported on the support part diametrically opposed in an axial direction with respect to the first linear direction, and
wherein the guide roller is arranged on the support part.

13. The baggage compartment according to claim 12,
wherein the linear drive comprises a spindle and an axial bearing, and
wherein the spindle is supported on the support part by the axial bearing.

14. An aircraft comprising at least one baggage compartment according to claim 1.

* * * * *

UNITED STATES PATENT AND TRADEMARK OFFICE
CERTIFICATE OF CORRECTION

PATENT NO. : 9,199,737 B2  
APPLICATION NO. : 13/827858  
DATED : December 1, 2015  
INVENTOR(S) : Graf et al.

Page 1 of 1

It is certified that error appears in the above-identified patent and that said Letters Patent is hereby corrected as shown below:

On the title page, items 72 and 30

Should Read:

(72) Oleg Graf, Illertissen (DE);
Michael Zinke, Postbauer-Heng (DE);
Andreas Hanft, Nuernberg (DE)

(30) Mar. 26, 2012 (DE).............................10 2012 005 918.3

Signed and Sealed this
Ninth Day of August, 2016

Michelle K. Lee
*Director of the United States Patent and Trademark Office*